July 16, 1929.  E. W. DAVIS  1,720,885
BOOSTER AND RELEASE VALVE
Filed April 4, 1927
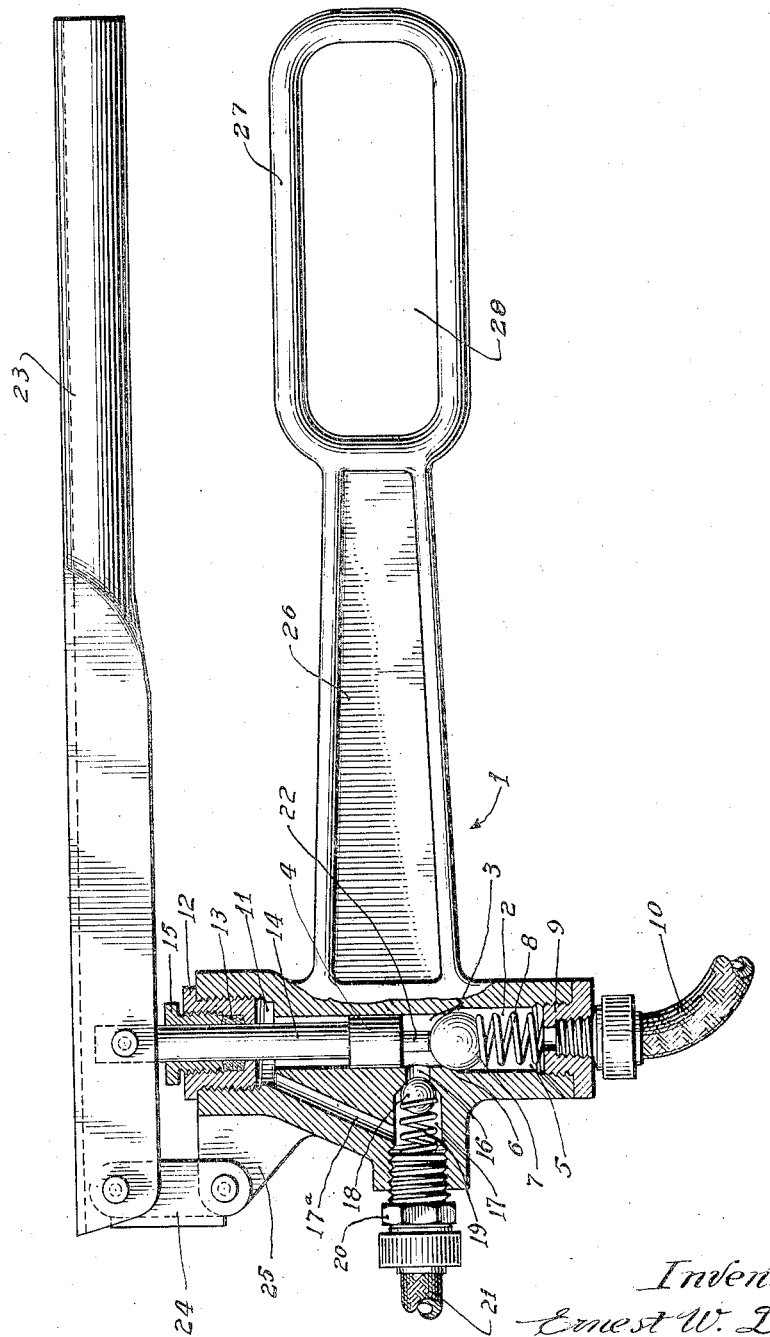
Inventor:
Ernest W. Davis.
By: Williams, Bradbury,
McCaleb & Hinkle
Atty's.

Patented July 16, 1929.

1,720,885

UNITED STATES PATENT OFFICE.

ERNEST W. DAVIS, OF OAK PARK, ILLINOIS, ASSIGNOR TO ALEMITE MANUFACTURING CORPORATION, OF CHICAGO, ILLINOIS, A CORPORATION OF DELAWARE.

BOOSTER AND RELEASE VALVE.

Application filed April 4, 1927. Serial No. 180,750.

My invention relates to improvements in lubricating apparatus and is particularly concerned with improvements in lubricating apparatus of that type in which the machine to be lubricated is provided with a plurality of nipples secured to the bearings thereof to which lubricant is supplied by a lubricant compressor having a flexible discharge conduit, the free end of which is provided with a coupling member adapted to be consecutively attached to and detached from the nipples secured to the bearings.

More specifically, my invention comprises a combined booster and release valve adapted to be located in the discharge conduit of a garage or service compressor such as that disclosed in my Patent No. 1,558,244, of October 20, 1925, to provide means for controlling the passage through said conduit and for increasing the pressure on the lubricant discharged through the nozzle in order to force it into frozen or otherwise highly resistant bearings.

An object of my invention is to provide a new and improved release valve.

Another object is to provide a new and improved booster.

Another object is to provide a booster adapted to be actuated by the pressure created by the garage compressor to double that pressure at the discharge nozzle.

Another object is to provide a novel booster in which the pressure can be increased, first by power means and thereafter further increased by manually operated means.

Another object is to provide a combined booster and release valve which is more efficient and convenient than any heretofore known.

Other objects and advantages will appear as the description proceeds.

In the drawing, the figure is an elevation of my new and improved booster and release valve, parts being shown in section.

Referring to the drawing, 1 indicates a casting having a transverse bore 2, reduced at 3 to form a cylinder in which is located the plunger 4. The lower end 5 of the bore 2 constitutes a valve chamber in which is located the ball valve 7 urged toward its seat 6 by the spring 8. The other end of the spring 8 abuts a member 9 screwed into the end of the enlarged part 5 of the bore and adapted to receive an end of the flexible conduit 10 leading to the discharge port of a garage compressor, not shown.

The opposite end 11 of the bore 2 is threaded to receive a nut 12 provided with a central opening in which is located a packing ring 13 firmly pressed against the piston stem 14 by the nut 15. Communicating with the lower end of the cylinder 3 is a passage 16 leading to a valve chamber 17 having a ball valve 18 pressed against its seat by a spring 19, the opposite end of which abuts a nut 20 having a passage therethrough and adapted to receive an end of the conduit 21 leading to the discharge nozzle (not shown). The upper end of the cylinder 3 is also connected to the valve chamber 17 by a passage 17$^a$.

Projecting from the lower end of the plunger 4 is a part 22 which normally rests on the ball valve 7, thereby determining the position of the plunger. The plunger 4 is operated by a handle 23 pivoted to the upper end of the piston stem 14 and also pivoted through a link 24 to a projecting lug 25 forming part of the casting 1. The casting 1 is further provided with a part 26 extending in a direction substantially parallel to that of the handle 23 and terminating in a handle part 27 having a substantially rectangular opening 28 therein.

Operation: The normal position of my booster and release valve is that shown in the drawing with the projection 22 resting on the ball valve 7 which is retained in place by the pressure of the spring 8 and the lubricant therebeneath. When the discharge nozzle is connected to a lubricant receiving nipple and it is desired to supply lubricant to the bearing supplied therethrough, the operator places his hand over the handle 23 with his fingers extending through the rectangular opening 28 in the handle part 27 and closes his hand, thereby moving the plunger 4 downwardly and causing the projection 22 to unseat the valve 7 and thus establish communication between the conduit 10 and the conduit 21 and permit lubricant to be forced into the bearing under the pressure created by the lubricant compressor.

If the bearing to be lubricated is a frozen bearing, that is, a bearing which has been long neglected and become clogged with dirt, rust or hardened grease, the pressure created by the lubricant compressor may be insufficient to force lubricant into the bearing and under these circumstances it is necessary to increase the pressure on the lubricant discharged through the nozzle. Under these conditions, the device is operated as previously described to open the valve 7 and permit lubricant to flow into and fill the conduit 21, passage 17$^a$ and upper part of the cylinder 3. This lubricant will be under the pressure created by the compressor which, by way of example, we will take as 1000 pounds per square inch.

The operator then releases his grip on the handle 23 and handle part 27, and permits the pressure of the lubricant beneath the plunger to force the plunger upwardly and increase the pressure on the lubricant in the upper part of the cylinder, the passage 17$^a$, and the conduit 21; this pressure being prevented from extending into the lower part of the cylinder 3 by the closing of the check valve 18. As the lubricant pressure tending to move the plunger upwardly, acts over the entire cross sectional area of the cylinder, whereas the resisting pressure of the lubricant above the plunger acts on a surface having approximately half this area, the pressure on the lubricant above the plunger is increased to 2000 pounds per square inch, or double that created by the lubricant compressor. If air is entrapped in the lubricant, it may be necessary for the operator to close and open his hand several times before a full 2000 pounds pressure is created at the discharge nozzle.

Where the doubled pressure created simply by closing and opening the hand of the operator, as previously described, is insufficient to force lubricant into the bearing, a greater pressure may be created by the operator grasping the handle part 27 with one hand and the handle 23 with the other hand and pulling these members in opposite directions, thereby moving the plunger 4 upwardly in the cylinder 3 and creating the necessary pressure in the upper part of the cylinder 3, the passage 17$^a$ and the conduit 21 to force lubricant into the bearing. It will be seen that I have provided an automatic means for doubling the pressure created by the lubricant compressor, and a manually operated means for further increasing this pressure when so desired.

Having thus illustrated and described my invention, what I desire to secure by United States Letters Patent is:

1. A combined booster and release valve, comprising, in combination, a lubricant passage, a check valve normally preventing flow of lubricant through said passage, a second check valve normally preventing reverse flow of lubricant through said passage, and means responsive to the pressure of the lubricant between said valves for increasing the pressure of the lubricant beyond said last-named valve.

2. Lubricating apparatus of the class described, comprising, in combination, a lubricant passage, a valve therein for preventing flow in one direction, a second valve for preventing flow in the opposite direction, means for opening one of said valves to permit lubricant to flow in one direction, means responsive to the pressure of the lubricant on the inlet side of said other valve to increase the pressure on the discharge side of said other valve, and manually operable means for further increasing the pressure on the discharge side of said other valve.

3. Lubricating apparatus of the class described, comprising, in combination, a combined booster and release valve including a discharge conduit, a valve for normally preventing flow of lubricant therethrough, manual means for opening said valve, power operated means for increasing the pressure on the discharge side of said valve, and manual means for further increasing said pressure.

4. In apparatus of the class described, a lubricant passage including a cylindrical part having a normally closed inlet and an outlet provided with a non-return valve, a plunger in said cylindrical part responsive to the pressure of the lubricant between said inlet and outlet for increasing the pressure of the lubricant beyond said outlet, and handle means for reciprocating said plunger.

5. A combined booster and release valve comprising, in combination, a body part providing a cylinder therein having a normally closed inlet and an outlet adjacent said inlet, a non-return valve in said outlet, a second outlet for said cylinder remote from said first named outlet and connected thereto at a point beyond said non-return valve, and a double acting plunger in said cylinder between said outlets.

6. In lubricating apparatus of the class described, a body part providing a cylinder, an inlet for said cylinder, an outlet adjacent each end of said cylinder, and a differential piston between said outlets responsive to the pressure of the lubricant introduced through said inlet for increasing the pressure on the lubricant beyond said outlets.

7. A combined booster and release valve for lubricating apparatus comprising, in combination, a body part providing a cylinder therein having an inlet adjacent one end thereof and an outlet adjacent each end thereof, a check valve normally closing said inlet, a non-return valve normally closing one of said outlets, and a differential plunger in said cylinder, said plunger having a part for contacting with and opening said inlet valve.

8. In lubricating apparatus of the class described, a body part having a cylinder therein and further providing a grip adapted to be engaged by a hand of the operator, said cylinder having a single inlet and two outlets, one adjacent each end of said cylinder, a check valve normally closing said inlet, a non-return valve in one of said outlets, a differential plunger in said cylinder for opening said inlet valve and discharging lubricant from said cylinder at a pressure greater than that of the lubricant entering said inlet, and a handle attached to said plunger and extending to a point adjacent said grip.

In witness whereof I hereunto subscribe my name this 29th day of March, 1927.

ERNEST W. DAVIS.